Dec. 30, 1924.

J. E. MESSENGER 1,521,308

BRAKE LEVER SPRING

Filed May 14, 1924

Witness
Ra Kusher

Inventor
Jack E. Messenger
by Bair & Freeman Attys.

Patented Dec. 30, 1924.

1,521,308

UNITED STATES PATENT OFFICE.

JACK E. MESSENGER, OF DES MOINES, IOWA.

BRAKE-LEVER SPRING.

Application filed May 14, 1924. Serial No. 713,328.

*To all whom it may concern:*

Be it known that I, JACK E. MESSENGER, a citizen of the United States, residing in Des Moines, in the county of Polk and State of Iowa, have invented a certain new and useful Brake-Lever Spring, of which the following is a specification.

The object of my invention is to provide a brake lever spring especially adapted for use on brake lever assemblies of the type used in Ford and other automobiles.

Still a further object is to provide a brake lever spring adapted to be quickly and easily attached to a brake lever assembly without disconnecting any of the parts of the brake lever assembly.

Still a further object is to provide a brake lever spring made of a single piece of wire having a hook on one end to engage a movable part of the brake lever assembly, and a loop capable of being opened when desired to extend around the fixed part of the brake lever assembly, and thereafter being locked thereon, for permitting the spring to function upon the operation of the brake lever assembly.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figures 1, 2:
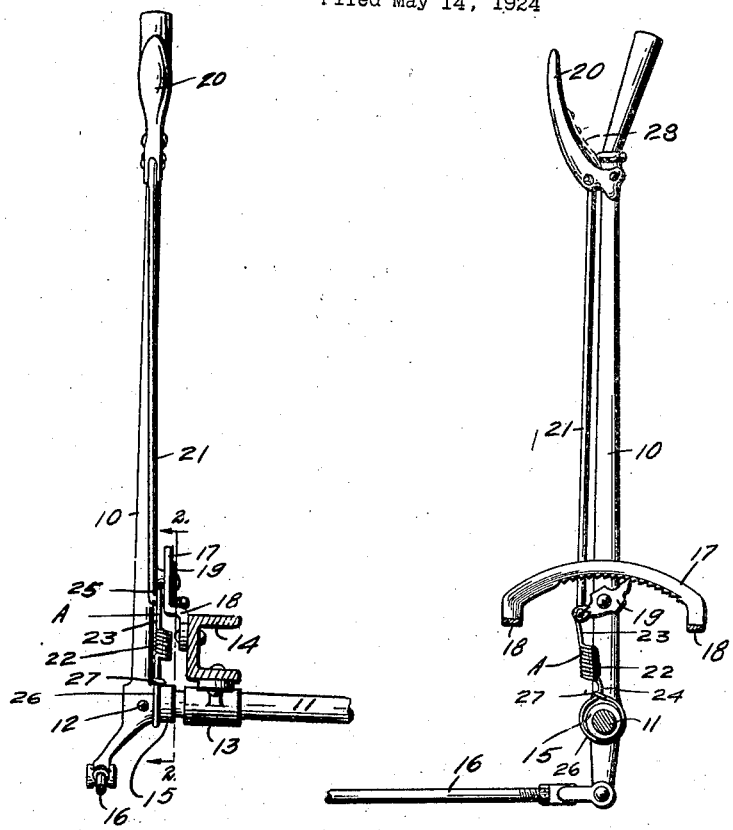
Figure 1 is a side elevation of a brake lever assembly with my impoved brake lever spring attached thereto.
Figure 2 is a sectional view taken on line 2—2 of Figure 1 showing the brake lever assembled and my brake lever spring.

In the accompanying drawings, I have used the reference numeral 10 to indicate generally a brake lever assembly. The brake lever 10 is mounted on a shaft 11 and is fixed thereto by a pin 12.

The shaft 11 is journalled in a bearing 13 fixed to a frame 14. The frame 14 is part of the chassis of a Ford automobile and is shown in section in Figure 1.

The brake lever 10 is provided with an enlarged hub 15. A connecting link 16 is secured to the lower end of the brake lever 10 and connects to the ordinary brake drum and band of an automobile.

Fixed to the frame or chassis 14 is a notched sector 17. The notched sector 17 has an offset portion 18 so as to space it away from the frame 14, as clearly shown in Figure 1 of the drawings.

Mounted on the brake lever 10 is a pawl 19 connected to an operating hand engaging piece 20 by a link 21. The pawl 19 is designed to normally engage the notches of the notched sector 17 for retaining the brake lever assembly in any of its positions.

In order to insure the engagement of the pawl 19 with the notched sector 17, I provide a brake lever spring A. The brake lever spring A consists of a single piece of wire formed with a center coil 22 having its two ends 23 and 24 project therefrom in opposite directions.

The end 23 is provided with a hook 25 adapted to engage a movable part of the brake lever assembly, as hereinafter more fully set forth. The end 24 is provided with an enlarged loop 26 capable of being opened and having its free end formed with a hook 27 adapted to engage and extend around the portion 24 for retaining the loop 26 in closed position, as clearly shown in Figure 3 of the drawings.

The center of the loop 26 and the longitudinal center of the coil spring 22, as well as the center of the hook 22, are all in substantial alignment for getting a very efficient spring action, that is, the line of pull on the spring is in substantially straight line.

The parts of the brake lever assembly are of the ordinary construction and it may be mentioned here that the operating handle 20 is usually provided with a leaf spring, shown by dotted lines 28, which serves to retain the pawl 19 in engaged position with the notched sector 17.

The particular leaf spring 29 becomes broken in a great many cases and in order to place a new one thereon, it is necessary to disconnect the entire brake lever assembly from the automobile, and my spring A can be attached without disconnecting any of the parts of the brake lever assembly, and operates as will now be explained.

Figure 3:
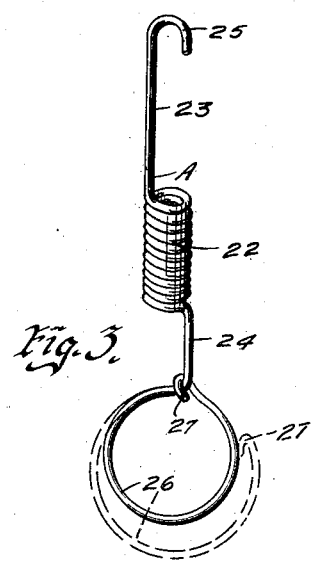
Figure 3 is a perspective view of my brake lever spring with the loop thereof shown in open position in dotted lines.

When the spring 28 is rendered inoperative, by becoming broken, then my spring can be attached by disconnecting the loop 26 and permitting it to move to the position shown in dotted lines in Figure 3.

The open loop 26 is then placed around the shaft 11 between the hub 15, and the bearing 13, so that the hook 27 can then be pushed around the lower end of the portion 24. The shaft 11 is smaller than the hub 15 and it is easy to snap the hooked end 27 over the lower portion 24.

After the loop 26 is closed, it can be slid on to the brake lever hub 15 and then the hook 25 placed over the link 21 between the major portion thereof and the pawl 19.

The link 21, of course, has its lower end bent at a right angle to the main body portion thereof so that it can extend through the pawl 19, and it is on this portion that I hook the upper end of the brake lever spring A.

From the construction and operation of the parts just described, it will be seen that the movable parts of the brake lever assembly, which consist of the pawl 19, the link 21 and the operating hand engaging piece 20 in the position shown in solid line in Figure 2 of the drawings.

The brake lever 10 which forms part of the brake lever assembly can be said to be the stationary or non-movable part of the brake lever assembly.

The spring A will retain the pawl 19 in engagement with the notched sector, and when the actuating hand piece 20 is moved against the action of the spring A, it will permit the pawl 19 to be disengaged for permitting the operating of the brake lever 10.

The spring A is attached to the link 21 near the pawl 19 and serves to prevent rattling of the parts due to the fact that it pulls the link 21 and the hand piece 20 downwardly.

My spring can be quickly and easily attached without disconnecting any of the parts of the brake lever assembly and there is sufficient room between the brake lever 10 and the frame 14 to permit it to be mounted between the hub 15 and the link 21.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In combination with a brake lever assembly, a brake lever spring comprising a spring wire formed into a coil with ends extending in opposite directions, a hook formed on one of said ends adapted to engage a movable part of said brake lever assembly and an open loop formed on the end to engage a nonmovable part of the brake lever assembly for anchoring the same thereto, the free end of said loop having a hook thereon for permitting the loop to be closed.

2. In combination with a brake lever, means for pivoting the brake lever near one end thereof, a notched sector adjacent the brake lever spaced substantially from the handle end thereof, a hand engaging operating piece pivoted to the handle adjacent the handle thereof, a pawl pivoted to the brake lever for coacting with the sector, a link pivoted to said piece and said pawl and a coil spring operatively connected at one end with said pawl having a loop at its other end for snapping over and surrounding the pivot of the brake lever for fastening the brake lever spring to the brake lever.

3. In combination with a brake lever, means for pivoting the brake lever near one end thereof, a notched sector adjacent the brake lever spaced substantially from the handle end thereof, a hand engaging operating piece pivoted to the handle adjacent the handle thereof, a pawl pivoted to the brake lever for coacting with the sector, a link pivoted to said piece and said pawl and a coil spring operatively connected at one end with said pawl having a loop at its other end for surrounding the pivot of the brake lever for fastening the brake lever spring to the brake lever, said loop having at its end a hook for closing the loop.

JACK E. MESSENGER.